(12) United States Patent
Wang et al.

(10) Patent No.: US 8,405,525 B2
(45) Date of Patent: Mar. 26, 2013

(54) TOUCH SENSING METHOD FOR RESISTIVE TYPE TOUCH APPARATUS

(75) Inventors: Wen-Chun Wang, Taichung (TW);
Kuo-Chang Su, Tainan County (TW);
Chih-Chang Lai, Taichung County (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 355 days.

(21) Appl. No.: 12/818,125

(22) Filed: Jun. 17, 2010

(65) Prior Publication Data

US 2010/0321214 A1 Dec. 23, 2010

(30) Foreign Application Priority Data

Jun. 18, 2009 (TW) ................................ 98120335 A

(51) Int. Cl.
*H03M 11/00* (2006.01)

(52) U.S. Cl. .............................. 341/20; 341/155; 341/22

(58) Field of Classification Search ..................... 341/22, 341/32, 28, 34, 20; 345/173; 340/407
See application file for complete search history.

(56) References Cited

U.S. PATENT DOCUMENTS

| | | | |
|---|---|---|---|
| 7,089,099 B2* | 8/2006 | Shostak et al. | 701/29.6 |
| 7,436,396 B2* | 10/2008 | Akieda et al. | 345/173 |
| 2005/0231313 A1* | 10/2005 | Shahoian | 335/220 |
| 2005/0275634 A1* | 12/2005 | Chi et al. | 345/173 |
| 2008/0126975 A1* | 5/2008 | Vassigh et al. | 715/772 |
| 2010/0103121 A1* | 4/2010 | Kim et al. | 345/173 |
| 2010/0141411 A1* | 6/2010 | Ahn et al. | 340/407.2 |
| 2010/0182245 A1* | 7/2010 | Edwards et al. | 345/173 |
| 2010/0302180 A1* | 12/2010 | Chang et al. | 345/173 |

* cited by examiner

*Primary Examiner* — Peguy Jean Pierre
(74) *Attorney, Agent, or Firm* — Jianq Chyun IP Office

(57) ABSTRACT

A touch sensing method for a resistive type touch apparatus includes a touch panel and a driving circuit. In the touch sensing method, a single-touch mode or a multi-touch mode can be selected. In addition, the touch sensing method includes an analog driving method and a digital driving method to equip the resistive type touch apparatus with at least two sorts of resolutions.

13 Claims, 8 Drawing Sheets

TOUCH SENSING METHOD FOR RESISTIVE TYPE TOUCH APPARATUS

CROSS-REFERENCE TO RELATED APPLICATION

This application claims the priority benefit of Taiwan application serial no. 98120335, filed on Jun. 18, 2009. The entirety of the above-mentioned patent application is hereby incorporated by reference herein and made a part of specification.

BACKGROUND OF THE INVENTION

1. Field of the Invention

The invention relates to a touch sensing method of a resistive type touch apparatus, and particularly to a touch sensing method by which a single-touch operation mode or a multi-touch operation mode can be selected and switched.

2. Description of Related Art

In general, in a resistive type touch apparatus, a four-wire type touch panel or a five-wire type touch panel is usually applied. However, the four-wire type touch panel or the five-wire type touch panel can only achieve a single-touch sensing. For achieving a multi-touch sensing, conductive lines on the touch panel are required to be arranged in array. Nevertheless, a built-in driving mechanism in a resistive type touch apparatus which has the multi-touch sensing function is usually limited to be either an analog driving mechanism or a digital driving mechanism. Thus, users can not choose the appropriate driving mechanism when employing the conventional resistive type touch apparatus. Besides, a function of changing the sensing resolution cannot be achieved by applying the conventional resistive type touch apparatus.

SUMMARY OF THE INVENTION

The invention provides a touch sensing method of a resistive type touch apparatus, such that an operation mode of the resistive type touch apparatus can be a single-touch mode or a multi-touch mode.

The invention provides a touch sensing method of a resistive type touch apparatus combining an analog driving method and a digital driving method, such that a resistive type touch apparatus is able to provide multiple resolutions.

According to an embodiment of the invention, a touch sensing method adapted to a resistive type touch apparatus is provided. The resistive type touch apparatus includes a touch panel and a driving circuit. The touch panel includes a first transparent substrate and a second transparent substrate which is disposed parallel and opposite to the first transparent substrate. Besides, a plurality of first conductive patterns are disposed on the first transparent substrate and extend along a first direction, and the adjacent first conductive patterns are parallel. A first electrode and a second electrode are respectively disposed on two ends of each of the first conductive patterns. In addition, a plurality of second conductive patterns are disposed on the second transparent substrate and extend along a second direction, and the adjacent second conductive patterns are parallel. The first conductive patterns and the second conductive patterns are located between the first transparent substrate and the second transparent substrate. A third electrode and a fourth electrode are respectively disposed on two ends of each of the second conductive patterns. Furthermore, a plurality of spacers are located between the first transparent substrate and the second transparent substrate. Overlapping portions between the first conductive patterns and the second conductive patterns are defined as a plurality of sensing blocks. A driving circuit is coupled to the first electrodes, the second electrodes, the third electrodes, and the fourth electrodes, such that a driving circuit can set the resistive type touch apparatus to operate in a digital mode or in an analog mode. The touch sensing method includes following steps. An operation mode is selected, such that the resistive type touch apparatus can operate either in a single-touch mode or in a multi-touch mode. When the resistive type touch apparatus operates in the single-touch mode, the driving circuit activates a first analog scan and sensing function. When the resistive type touch apparatus operates in the multi-touch mode, the driving circuit activates either a second analog scan and sensing function or a digital scan and sensing function. When the digital scan and sensing function is activated, and the driving circuit senses that one of the sensing blocks is touched, the driving circuit then activates the first analog scan and sensing function.

According to an embodiment of the invention, when the driving circuit activates the first analog scan and sensing function, the driving circuit simultaneously inputs a first voltage to the first electrodes and a second voltage to the second electrodes. The first voltage is 5V, for example, and the second voltage is 0V, for example, such that a voltage difference is generated between the two ends of each of the first conductive patterns. Next, the third electrodes sense a first voltage division signal and then send back the first voltage division signal to the driving circuit, such that a coordinate X in the first direction is defined. Thereafter, the driving circuit simultaneously inputs a third voltage to the third electrodes and a fourth voltage to the fourth electrodes in order to generate a voltage difference between the two ends of each of the second conductive patterns. Afterwards, the first electrodes of the first conductive patterns sense a second voltage division signal and then send back the second voltage division signal to the driving circuit, such that a coordinate Y in the second direction is defined. Finally, the coordinate X in the first direction and the coordinate Y in the second direction are combined to determine a touch position (X, Y). Besides, when the first electrodes receive the first voltage, the first electrodes are able to be selectively electrically connected with each other. Meanwhile, all of the second electrodes are electrically connected with one another so as to receive the second voltage. Similarly, when the third electrodes receive the third voltage, the third electrodes are able to be selectively electrically connected with one another. Meanwhile, all of the fourth electrodes are electrically connected with one another so as to receive the fourth voltage.

According to an embodiment of the invention, when the resistive type touch apparatus operates in the multi-touch mode, the driving circuit is able to selectively activate the second analog scan and sensing function. Here, the resolution of the touch position can be further classified into a low resolution analog mode and a high resolution analog mode.

According to an embodiment of the invention, when the resistive type touch apparatus operates in the multi-touch mode, the driving circuit can only activate the digital scan and sensing function and outputs the touch position with low resolution corresponding to the touched sensing block. Alternatively, the driving circuit is able to activate the digital scan and sensing function first and then activates the second analog scan and sensing function, such that the touch position can be precisely determined.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
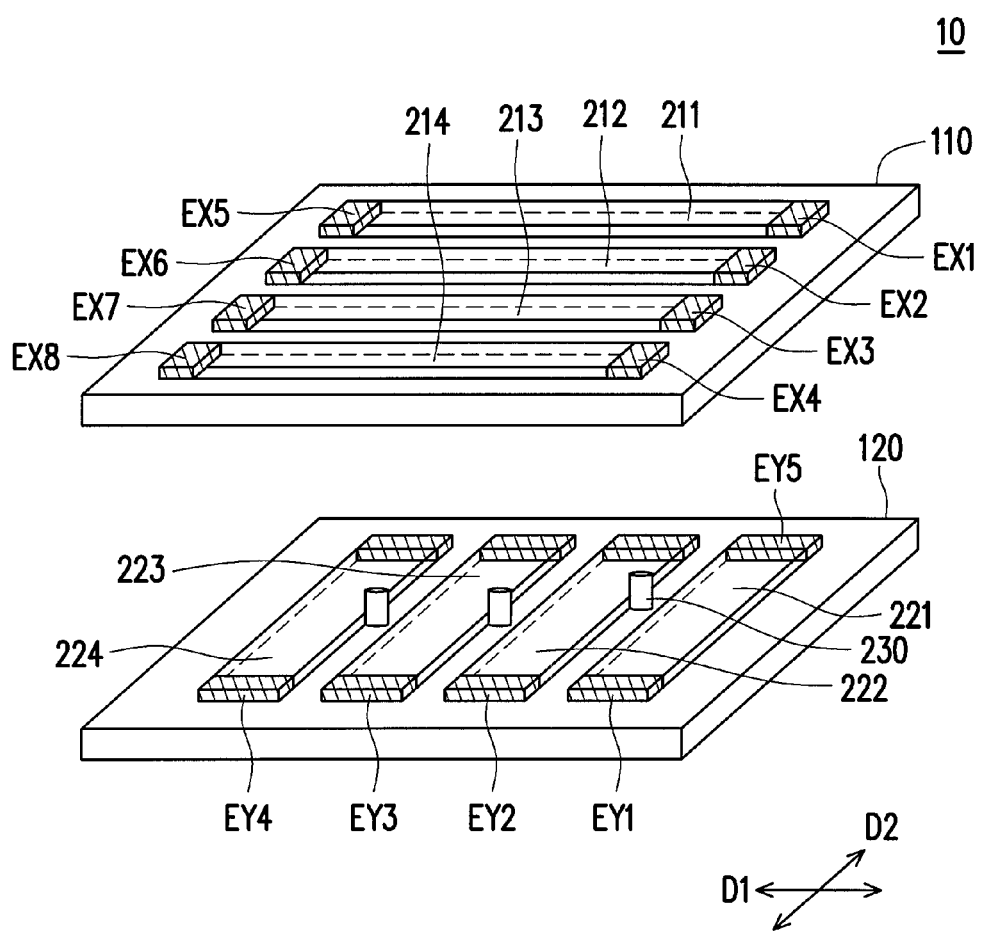
FIG. 1 is a schematic view of a touch panel according to an embodiment of the invention.
Figure 2:
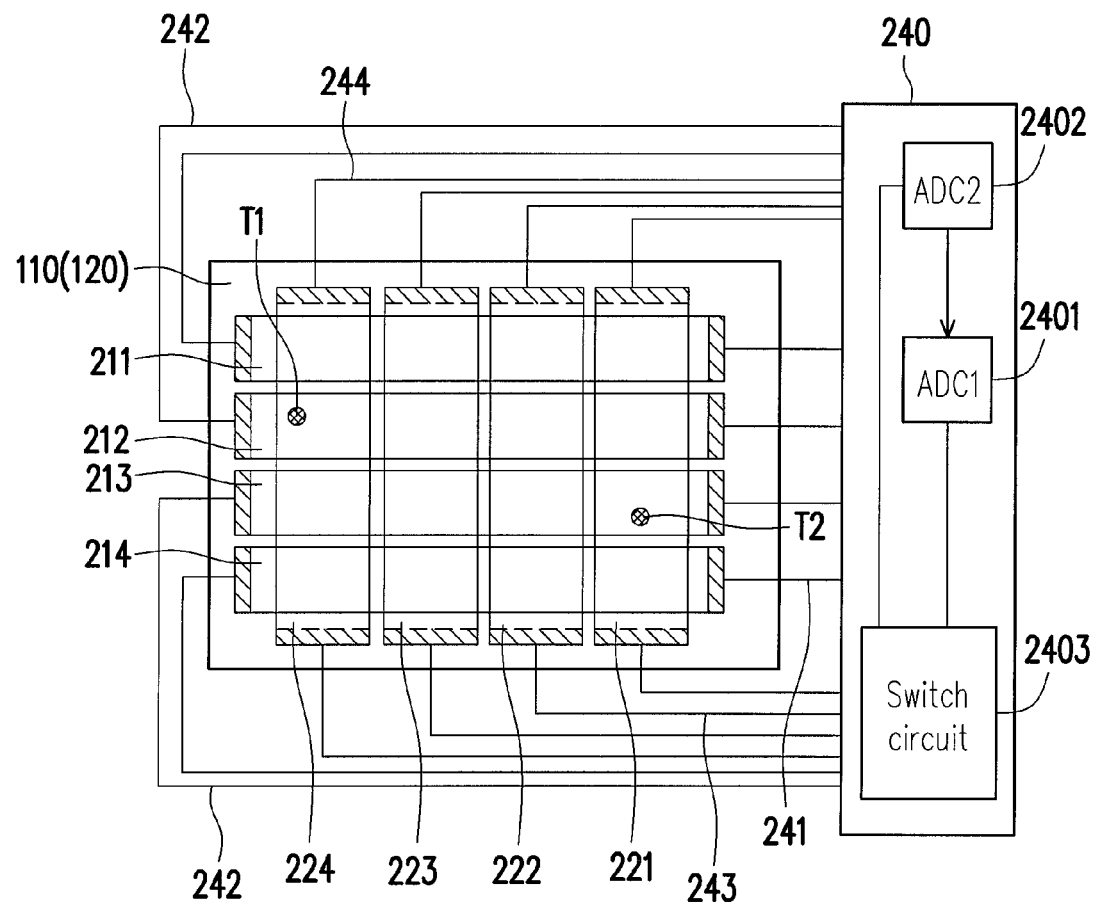
FIG. 2 is a top view of a resistive type touch apparatus applied in the touch panel depicted in FIG. 1.

FIG. 1 is a schematic view of a touch panel according to an embodiment of the invention, and FIG. 2 is a top view of a resistive type touch apparatus applied in the touch panel depicted in FIG. 1. Referring to both FIG. 1 and FIG. 2, a resistive type touch apparatus 20 includes a touch panel 10 and a driving circuit 240 electrically connected with the touch panel 10.

The touch panel 10 includes a first transparent substrate 110, a plurality of first conductive patterns 211~214, a second transparent substrate 120, a plurality of second conductive patterns 221~214, and a plurality of spacers 230. The first conductive patterns 211~214 are disposed on the first transparent substrate 110. The second transparent substrate 120 is disposed opposite to the first transparent substrate 110. The second conductive patterns 221~224 are disposed on the second transparent substrate 120. Besides, the first conductive patterns 211~214 and the second conductive patterns 221~224 are located between the first transparent substrate 110 and the second transparent substrate 120. The spacers 230 are located between the first transparent substrate 210 and the second transparent substrate 220.

As shown in FIG. 1 and FIG. 2, each of the first conductive patterns 211~214 is parallel to one another along a first direction D1. One end of each of the first conductive patterns 211~214 is respectively coupled to each of the first electrodes EX1~EX4, and the opposite end of each of the first conductive patterns 211~214 is respectively coupled to each of the second electrodes EX5~EX8. Meanwhile, each of the second conductive patterns 221~224 is parallel to one another along a second direction D2. One end of each of the second conductive patterns 221~224 is respectively coupled to one of the third electrodes EY1~EY4, and the opposite end of each of the second conductive patterns 221~224 is respectively coupled to one of the fourth electrodes EY5~EY8. In addition, the first direction D1 intersects the second direction D2, preferably perpendicular to the second direction D2.

It should be noted that although the touch panel 10 of this embodiment exemplarily includes four first conductive patterns 211~214 and four second conductive patterns 221~224, the invention is not limited thereto. In another embodiment, the number of the conductive patterns of the touch panel 10 can be more than or less than four, wherein the conductive patterns are intersected with one another. In this embodiment, a plurality of sensing blocks are formed in overlapping portions between the first conductive patterns 211~214 and the second conductive patterns 221~224. As shown in FIG. 2, there are total 4×4=16 sensing blocks. When a user touches the touch panel 10, the first conductive pattern and the second conductive pattern of the touch panel 10 are connected and conducted, such that a corresponding sensing signal is generated.

As shown in FIG. 1 and FIG. 2, the driving circuit 240 is coupled to the first electrodes EX1~EX4, the second electrodes EX5~EX8, the third electrodes EY1~EY4, and the fourth electrodes EY5~EY8 respectively via signal lines 241~244. Thereby, the driving circuit 240 is able to selectively set the resistive type touch apparatus 20 to operate either in a digital mode or in an analog mode.

Figure 3:
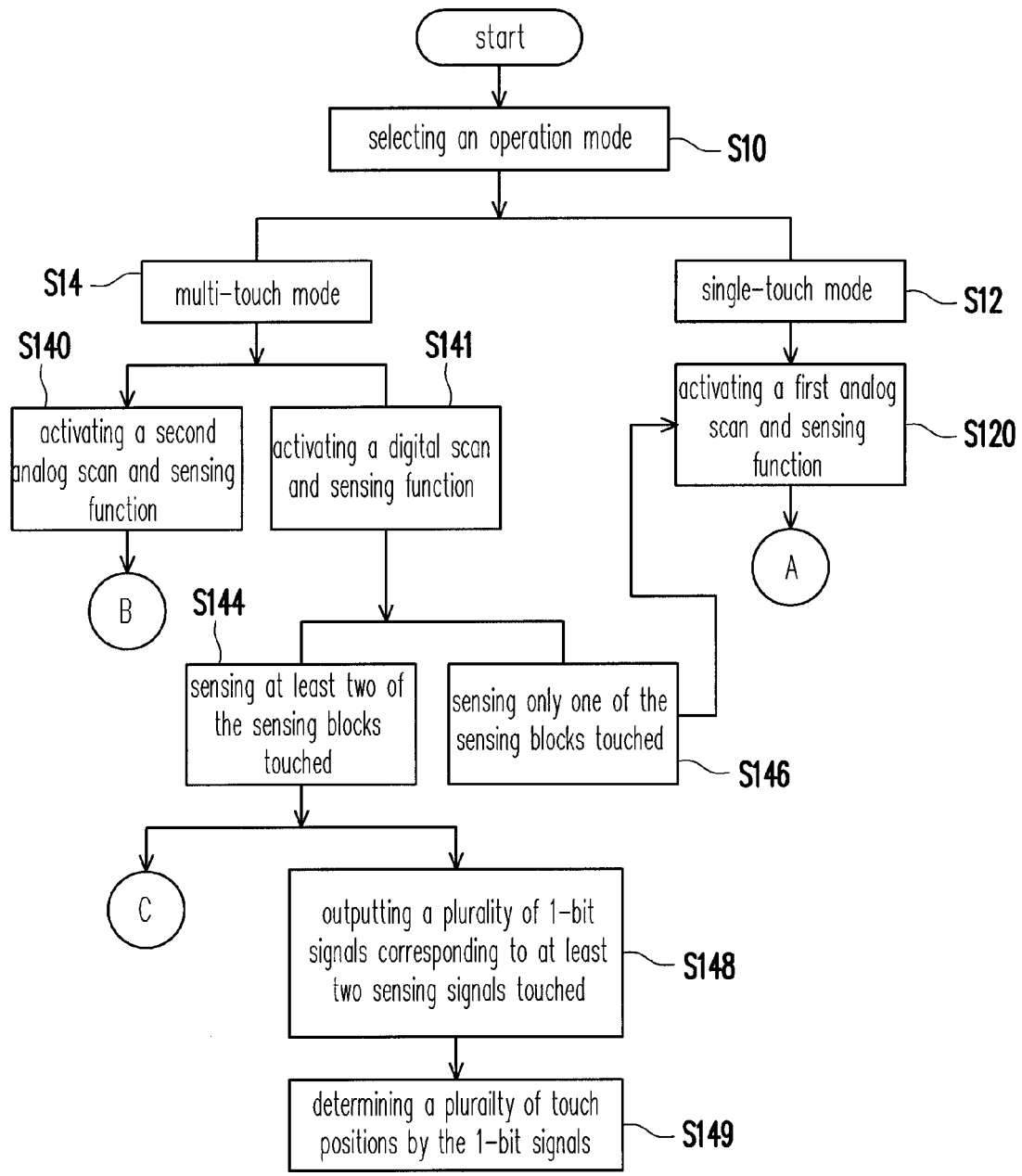
FIG. 3 is a flowchart of a touch sensing method according to an embodiment of the invention.

Please refer to FIG. 3 which is a flowchart of a touch sensing method according to an embodiment of the invention. The touch sensing method includes following steps. First, as shown in step S10, an operation mode is selected, such that the resistive type touch apparatus 20 is able to operate either in a single-touch mode (step S12) or in a multi-touch mode (step S14). The operation mode can be preset before a user executes an operation, or the driving circuit 240 can automatically determine the operation mode after a user executes an operation. When the resistive type touch apparatus 20 operates in the single-touch mode (step S12), the driving circuit 240 activates a first analog scan and sensing function, such that a touch position is determined. On the other hand, when the resistive type touch apparatus 20 operates in the multi-touch mode (step S14), the driving circuit 240 activates either a second analog scan and sensing function (step S140) or a digital scan and sensing function (step S141).

In detail, when the digital scan and sensing function is activated (step S141), and the driving circuit 240 senses that only one of the sensing blocks is touched (step S146), the driving circuit 240 returns to the single-touch mode (step S12) and then activates the first analog scan and sensing function (step S120), such that a final touch position is determined. Thereby, the touch position can be precisely determined when a user touches the resistive type touch apparatus 20 by one finger or by an object. For example, when a point T1 in FIG. 2 is touched, the driving circuit 240 senses a sensing signal corresponding to a sensing block which refers to an overlapping portion between the first conductive pattern 212 and the second conductive pattern 224. At this time, the driving circuit 240 switches to the single-touch mode (step S12) and determines the touch position in an analog driving manner.

On the other hand, when the driving circuit 240 senses that at least two of the sensing blocks are touched, the driving circuit 240 can determine the touch position by two methods stated below. The first one is that the driving circuit 240 directly senses the sensing signal to determine the touch position. The second one is that the driving circuit 240 further activates a third analog scan and sensing function. For example, when points T1 and T2 in FIG. 1 are touched simultaneously, the driving circuit 240 senses two sensing signals respectively directed to two sensing blocks that correspond to the point T1 and the point T2. At this time, the driving circuit 240 outputs two 1-bit signals corresponding to the two sensing signals as shown in step S148. Next, the touch position is determined by said two 1-bit signals (step S149). The third analog scan and sensing function activated by applying the second method will be elaborated hereinafter.

Figure 4:
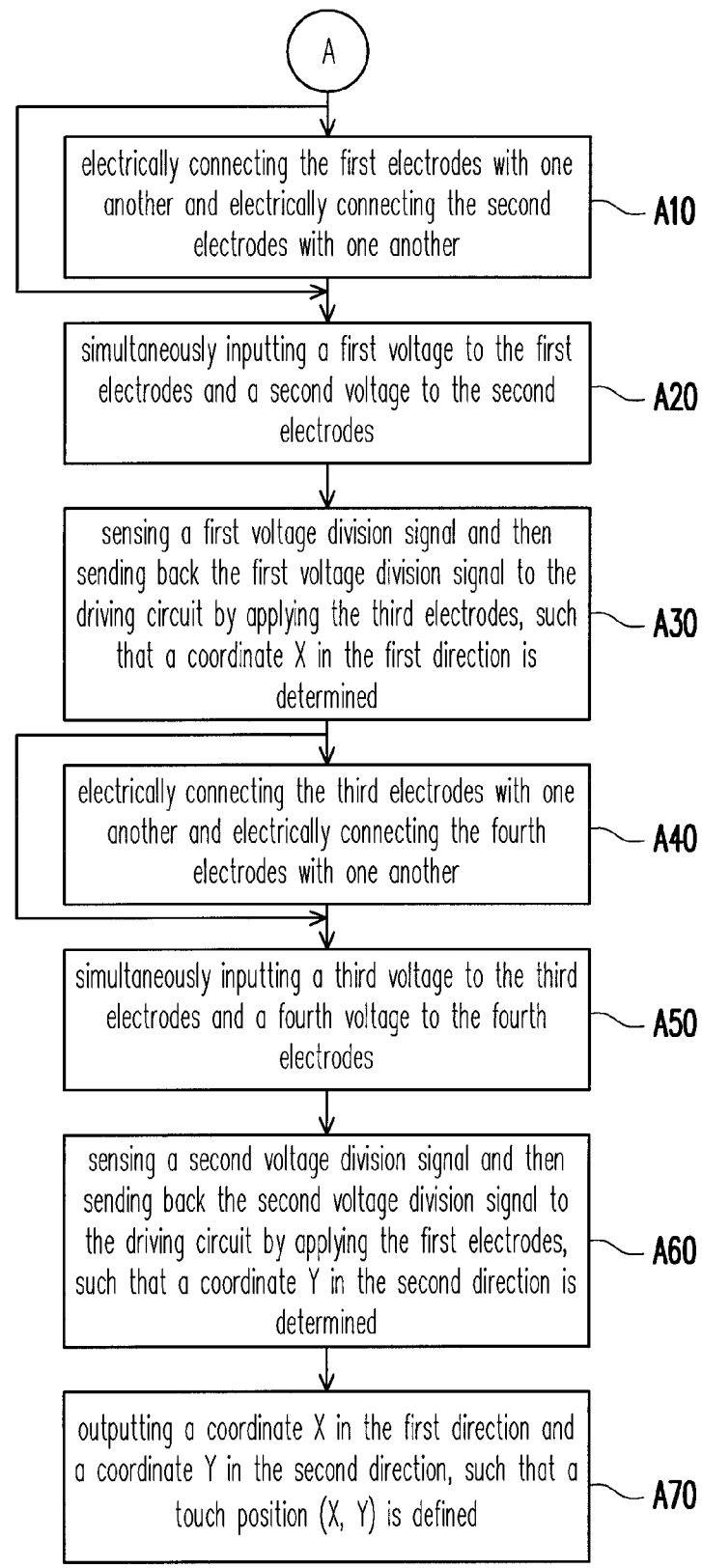
FIG. 4 is a flowchart illustrating steps that are performed after a first analog scan and sensing function is activated in a touch sensing method according to an embodiment of the invention.

Please refer to FIG. 1 to FIG. 4. FIG. 4 is a flowchart illustrating steps that are performed after the first analog scan and sensing function is activated in the touch sensing method according to an embodiment of the invention. After the first analog scan and sensing function is activated (step S140), the driving circuit 240 simultaneously inputs a first voltage to the first electrodes EX1~EX4 and inputs a second voltage to the second electrodes EX5~EX8 as shown in step A20. The first voltage is 5V, for example, and the second voltage is 0V, for example, such that a voltage difference 5V is generated between two ends of each of the first conductive patterns 211~214. Next, as shown in step A30, the third electrodes EY1~EY4 or the fourth electrodes EY5~EY8 sense a first voltage division signal and then send back the first voltage division signal to the driving circuit 240, such that a coordinate X in the first direction is defined. Thereafter, as shown in step A50, the driving circuit 240 simultaneously inputs a third voltage to the third electrodes EY1~EY4 and inputs a fourth voltage to the fourth electrodes EY5~EY8. The third voltage is 5V, for example, and the fourth voltage is 0V, for example. After that, as shown in step A60, the first electrodes EX1~EX4 or the second electrodes EX5~EX8 sense a second voltage division signal and then send back the second voltage division signal to the driving circuit 240, such that a coordinate Y in the second direction is defined. Finally, as shown in step A70, a touch position (X, Y) is determined by combining the coordinate X in the first direction and the coordinate Y in the second direction.

Figure 5:
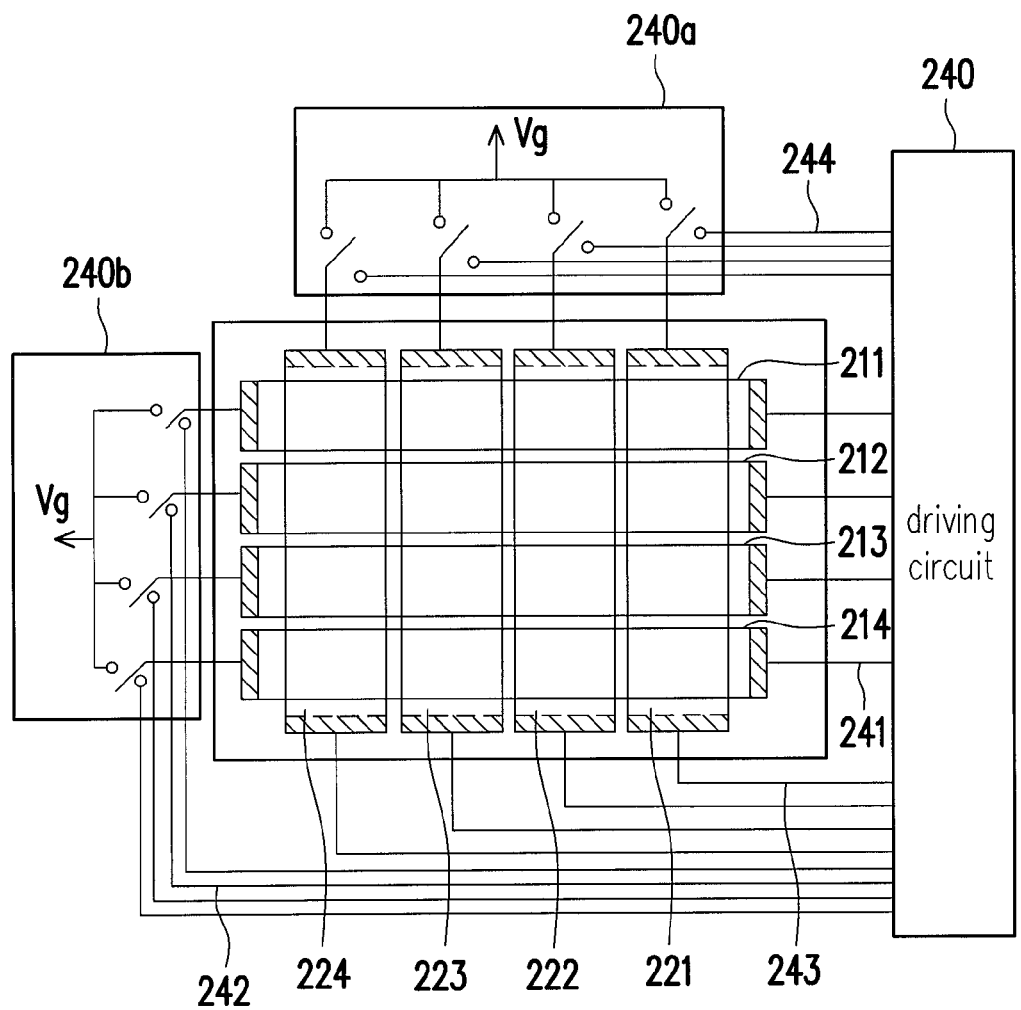
FIG. 5 is a schematic view of a resistive type touch apparatus showing that second and fourth electrodes are selectively short and grounded according to an embodiment of the invention.

In the above-mentioned steps of the touch sensing method, before steps A20 and A50 are executed, the electrodes may be electrically connected with one another in advance and then receive the voltages as shown in steps A10 and A40. In step A10, the first electrodes EX1~EX4 are electrically connected with one another so as to receive the first voltage. Meanwhile, the second electrodes EX5~EX8 are electrically connected with one another so as to receive the second voltage. In step A40, the third electrodes EY1~EY4 are electrically connected with one another so as to receive the third voltage. Meanwhile, the fourth electrodes EY5~EY8 are electrically connected with one another so as to receive the fourth voltage. The concept of the electrode short circuit is shown in FIG. 5, which is a schematic view of a touch apparatus according to an embodiment of the invention. The second electrodes EX5~EX8 and the fourth electrodes EY5~EY8 can be selectively short and grounded as indicated in FIG. 5. A sub-circuit 240a and a sub-circuit 240b are parts of circuits of the driving circuit 240 and exemplarily shown in FIG. 5, while the circuit design of the invention is not limited thereby. As shown by the sub-circuits 240a and 240b, each of the second electrodes EX5~EX8 and each of the fourth electrodes EY5~EY8 can be connected with the signal lines 242 and 244 to receive signals or be short with one another and connected to a ground voltage Vg through switching a switch. Furthermore, each of the signal lines 242 can be short via switching another switch to replace the sub-circuit 240a. The circuit design of the invention is not limited to the above, and other circuit designs capable of providing the same function are applicable.

When the resistive type touch apparatus operates in the multi-touch mode, the driving circuit 240 can selectively activate the second analog scan and sensing function or the digital scan and sensing function. In other words, in the multi-touch mode, the driving circuit 240 can sense a single touch position or multiple touch positions. On the contrary, in the single-touch mode, the driving circuit 240 is able to sense only a single touch position, which is different from that in the multi-touch mode. Please refer to FIG. 6, which is a flowchart illustrating steps that are performed after the second analog scan and sensing function is activated in the touch sensing method according to an embodiment of the invention. First, in step B10, the driving circuit 240 sequentially inputs different voltages to the two ends of each of the first conductive patterns 211~214 respectively via the first electrodes EX1~EX4 and the second electrodes EX5~EX8. For example, a voltage at 5V is respectively input to the first electrodes EX1~EX4, and a voltage at 0V is respectively and correspondingly input to the second electrodes EX5~EX8. Besides, in step B20, the third electrodes EY1~EY4 (or the fourth electrodes EY5~EY8) sense at least a first sensing signal S1 and send back the first sensing signal S1 to the driving circuit 240, such that at least one coordinate X in the first direction is determined. That is to say, one coordinate X or several coordinates X1, X2, X3, etc. can be determined by achieving the second analog scan and sensing function. In step B30, the driving circuit 240 sequentially inputs different voltages to the two ends of each of the second conductive patterns 221~224 respectively via the third electrodes EY1~EY4 and the fourth electrodes EY5~EY8. In step B40, the first electrodes EX1~EX4 (or the second electrodes EX5~EX8) sense at least a second sensing signal S2 and send back the second sensing signal S2 to the driving circuit 240, such that at least one coordinate Y in the second direction is determined. Finally, at least one touch position (X, Y) is determined by combining the at least one coordinate X in the first direction and the at least one coordinate Y in the second direction. As shown in steps B520, B614, and B622, the final touch positions can be one touch position (X, Y) or several touch positions (X1, Y1), (X2, Y2), (X3, Y3), etc. For example, referring to FIG. 2, the touch position can be the point T1 which can be determined by the coordinate X in the first direction and the coordinate Y in the second direction. Alternatively, the touch positions can be the points T1 and T2 which can be determined by the two coordinates X1 and X2 in the first direction and the two coordinates Y1 and Y2 in the second direction. In addition, the touch sensing method may further include other steps based on requirements for resolution, and detailed descriptions will be described later.

Figure 6:
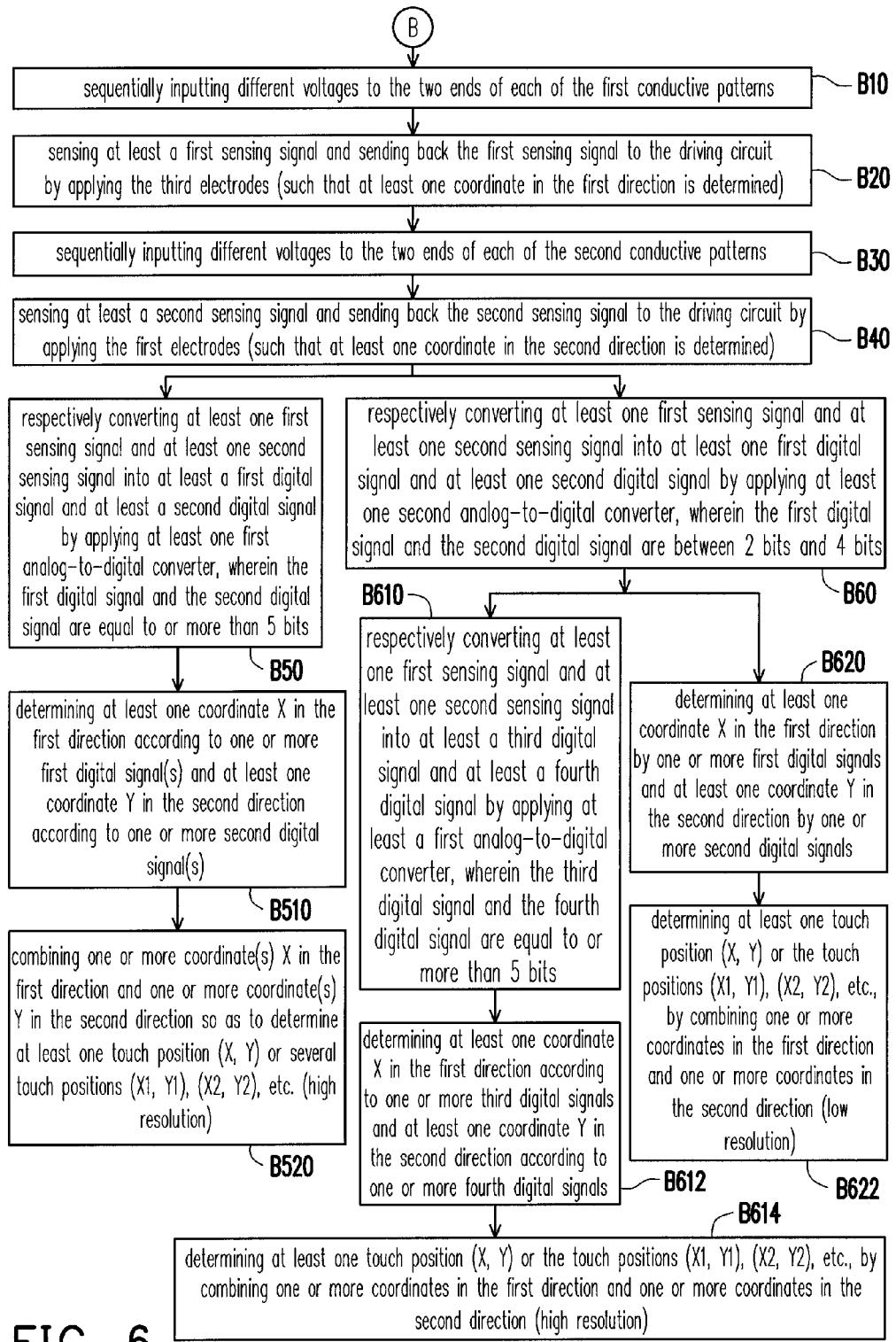
FIG. 6 is a flowchart illustrating steps that are performed after a second analog scan and sensing function is activated in a touch sensing method according to an embodiment of the invention.

Referring to both FIG. 2 and FIG. 6, the driving circuit 240 has at least an analog-to-digital converter (ADC), such as the analog-to-digital converter ADC1 (2401) and the analog-to-digital converter ADC2 (2402) shown in FIG. 2. One or several first sensing signals S1 and one or several second sensing signals S2 that are sensed in step B10 can be respectively converted into a first digital signal DS1 or several first digital signals DS1 and a second digital signal DS2 or several second digital signals DS2 by the analog-to-digital converter ADC. After that, the coordinate X or the coordinates X1, X2, X3, etc., in the first direction are determined according to one first digital signal DS1 or more than one first digital signals DS1, and the coordinate Y or the coordinates Y1, Y2, Y3, etc., in the second direction are determined according to one second digital signal DS2 or more than one second digital signals DS2. When the first digital signal DS1 and the second digital signal DS2 are between 2 bits and 4 bits, the resistive type touch apparatus 20 is defined as operating in a low resolution analog mode. When the first digital signal DS1 and the second digital signal DS2 are equal to or more than 5 bits, the resistive type touch apparatus 20 are defined as operating in a high resolution analog mode.

Specifically, referring to FIG. 2, it is assumed that the driving circuit 240 has at least one analog-to-digital converter ADC1 (2401), and the analog-to-digital converter ADC1 (2401) outputs a signal equal to or more than 5 bits. That is, the resolution of the coordinate X or Y is greater than 32. For example, if the first voltage V1 is 5V, and the second voltage V2 is 0V, a 0V~5V voltage gradient distribution is generated along the first direction D1 in each of the first conductive patterns 211~214 when the first conductive patterns 211~214 are sequentially scanned. Take the 4×4=16 sensing blocks in the embodiment as an example. The sensing signals corresponding to the overlapping portions between the first conductive patterns 211~214 and the second conductive pattern 221 are, for example, at 0.6V~1.4V. The sensing signals corresponding to the overlapping portions between the first conductive patterns 211~214 and the second conductive pattern 222 are, for example, at 1.6V~2.4V. The sensing signals corresponding to the overlapping portions between the first conductive patterns 211~214 and the second conductive pattern 223 are, for example, at 2.6V~3.4V. The sensing signals corresponding to the overlapping portions between the first conductive patterns 211~214 and the second conductive pattern 224 are, for example, at 3.6V~4.4V. When the touch position is the point T1 in the overlapping portion between the first conductive pattern 212 and the second conductive pattern 224, the sensing signal sensed in the first direction is at 0.6V~1.4 V. That is to say, the range of the sensing signal sensed along the first direction in this overlapping portion is 1.4V−0.6V=0.8V. If the sensing signal converted and output by the analog-to-digital converter ADC1 (2401) is 10 bits, then 0.8V is able to be divided into 1024 parts. In other words, the resolution of the coordinate X sensed in the point T1 is 1024. Hence, the total resolution of the four first conductive patterns 211~214 and the four second conductive patterns 221~224 is respectively 1024×4=4096 corresponding to the first direction and 1024×4=4096 corresponding to the second direction.

Referring to FIG. 6, in step B50, at least one first analog-to-digital converter ADC1 respectively converts at least one first sensing signal S1 and at least one second sensing signal S2 into at least a first digital signal DS1 and at least a second digital signal DS2. The first digital signal DS1 and the second digital signal DS2 are equal to or more than 5 bits. Next, in step B510, at least one coordinate X in the first direction is determined by one or several first digital signals DS1, and at least one coordinate Y in the second direction is determined according to one or several second digital signals DS2. Finally, as shown in step B520, at least one touch position (X, Y) or several touch positions (X1, Y1), (X2, Y2), etc., are determined by combining one or several coordinates X in the first direction and one or several coordinates Y in the second direction. Apparently, the touch position defined by performing the steps B50, B510, and B520 is in the high resolution analog mode.

On the other hand, as shown in steps B60, B620 and B622, the low resolution analog mode may be selected to reduce the calculation load of the driving circuit 240, such that fast scanning and sensing of the driving circuit 240 is achieved. In step B60, at least one second analog-to-digital converter ADC2 (shown in FIG. 2) respectively converts at least one first sensing signal S1 and at least one second sensing signal S2 into at least one first digital signal DS1 and at least one second digital signal DS2. At this time, the first digital signal DS1 and the second digital signal DS2 are between 2 bits and 4 bits. Thereafter, in step B620, at least one coordinate X in the first direction is determined by one or several first digital signals DS1, and at least one coordinate Y in the second direction are determined by one or several second digital signals DS2. Finally, in step B622, at least one touch position (X, Y) or several touch positions (X1, Y1), (X2, Y2), etc., are determined by combining one or several coordinates in the first direction and one or several coordinates in the second direction.

Another way to improve the resolution of the touch position is illustrated in steps B60, B610, B612, and B614. That is, the low resolution analog mode is activated first, and the high resolution analog mode is activated thereafter. Step B610 is performed after step B60, and at this time, at least one first analog-to-digital converter ADC1 (2401) respectively converts one or several first sensing signals S1 and one or several second sensing signals S2 sensed in step B60 into at least a third digital signal DS3 and at least a fourth digital signal DS4. Besides, the third digital signal DS3 and the fourth digital signal DS4 are equal to or more than 5 bits. In addition, the first sensing signal S1 and the second sensing signal S2 obtained in step B60 can be stored temporarily. Thus, the first analog-to-digital converter ADC1 (2401) is able to directly convert the first sensing signal S1 and the second sensing signal S2 into the third digital signal DS3 and the fourth digital signal DS4 without performing the scanning and sensing again in step B610. Step B612 is then performed. The driving circuit 240 determines at least one coordinate X in the first direction according to one or several third digital signals DS3 and determines at least one coordinate Y in the second direction according to one or several fourth digital signals DS4. Finally, step B614 is performed. At least one touch position (X, Y) or several touch positions (X1, Y1), (X2, Y2), etc., are determined by combining the aforesaid one or several coordinates in the first direction and the aforesaid one or several coordinates in the second direction. In consideration of the circuit design, for example, the first analog-to-digital converter ADC1 (2401) and the second analog-to-digital converter ADC2 (2402) can be coupled to a switch circuit 2403, such that the sensing signal can be processed by the first analog-to-digital converter ADC1 (2401) or the second analog-to-digital converter ADC2 (2402). There are many different kinds of circuit designs in practice, and the circuit design mentioned herein is only for reference but not for limiting the driving circuit of the invention.

Figure 7:
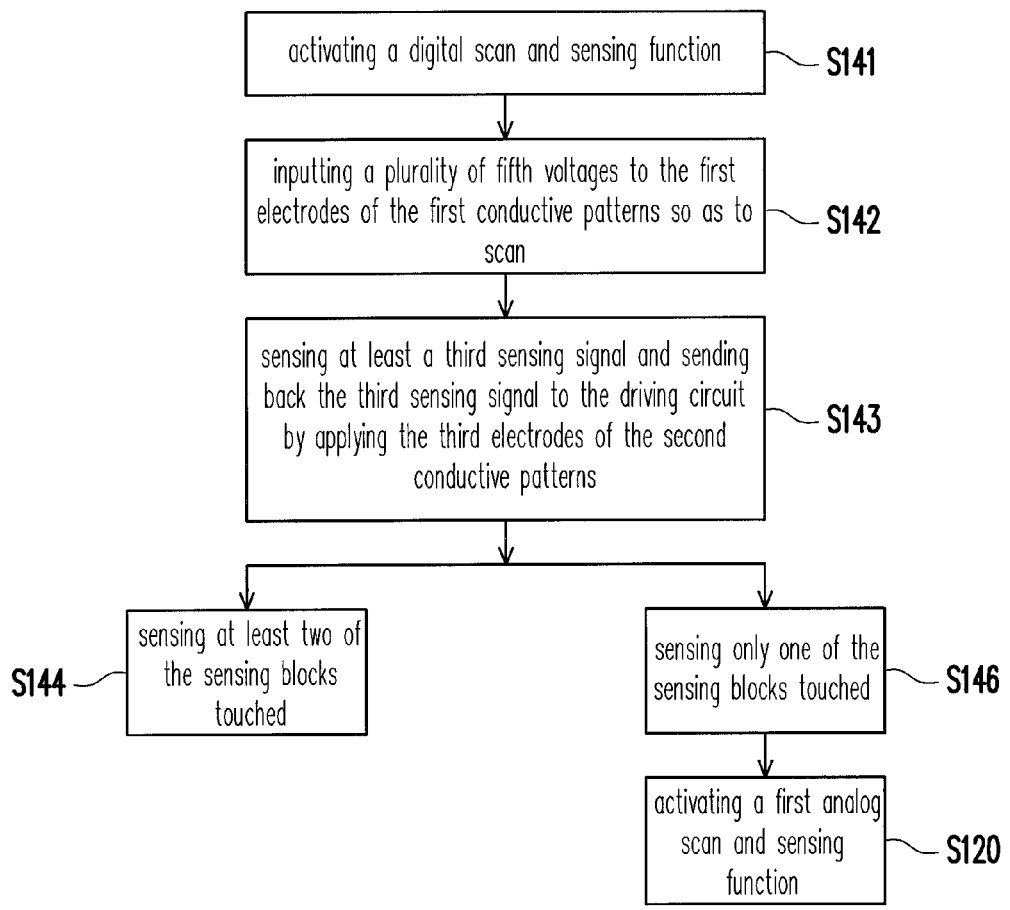
FIG. 7 is a flowchart illustrating steps that are performed after a digital scan and sensing function is activated in a touch sensing method according to an embodiment of the invention.

Please refer to FIG. 3 and FIG. 7. FIG. 7 is a flowchart illustrating steps that are performed after the digital scan and sensing function is activated in the touch sensing method according to an embodiment of the invention. After step S141, step S142 is performed. The driving circuit 240 inputs a plurality of fifth voltages (e.g. 5V) to the first electrodes EX1~EX4 of the first conductive patterns 211~214 or to the second electrodes EX5~EX8, such that the fifth voltage serves as scanning signals, and an scanning process is executed. When step S143 is executed, the third electrodes EY1~EY4 or the fourth electrodes EY5~EY8 of the second conductive patterns 221~224 sense at least a third sensing signal S3 and send back the third sensing signal S3 to the driving circuit 240. Thereafter, the driving circuit 240 can perform either step S144 or step S146. Details in this regard are provided in the above descriptions and therefore are not repeated herein.

Figure 8:
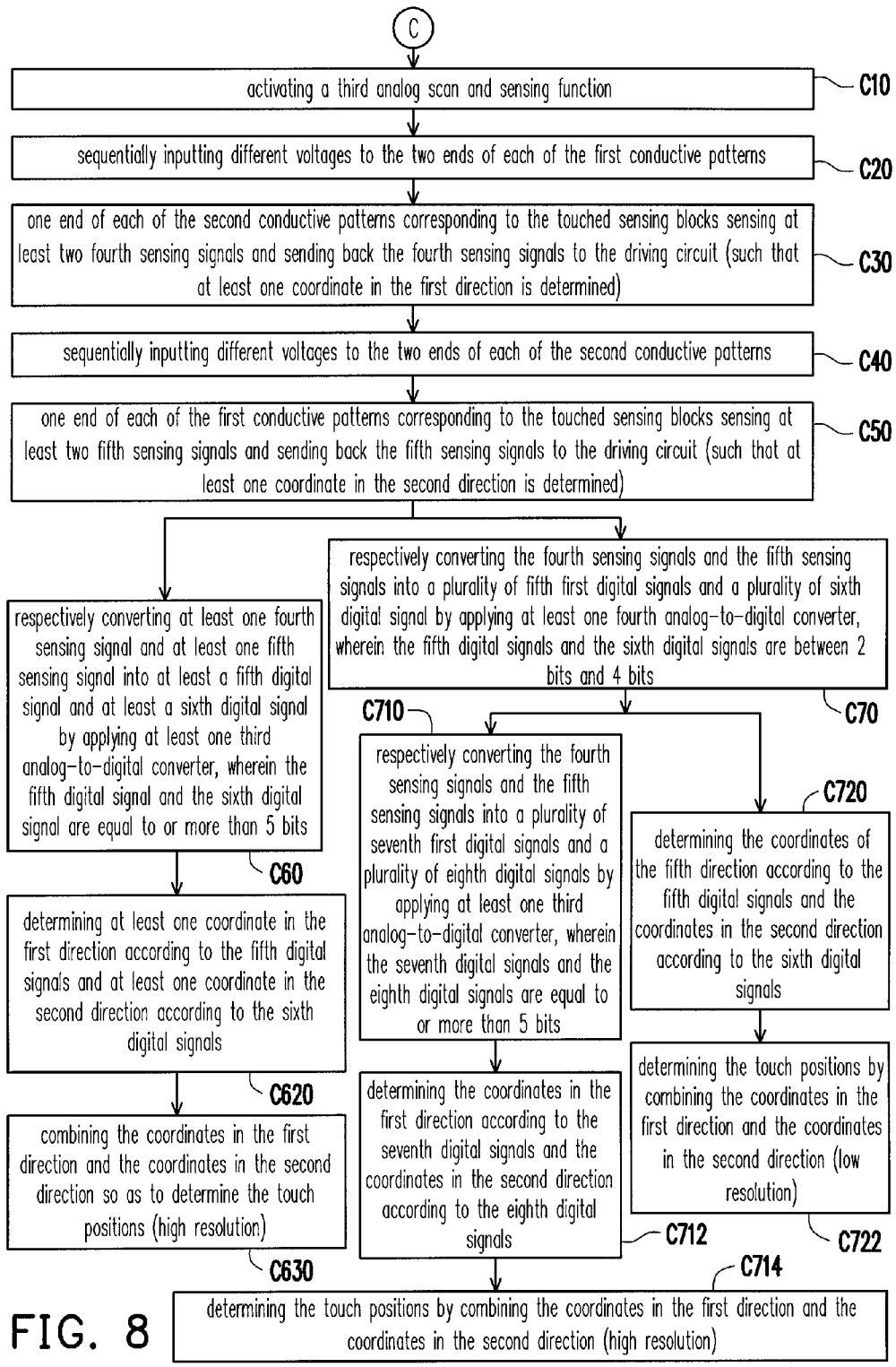
FIG. 8 is a flowchart illustrating steps that are performed after a third analog scan and sensing function is activated in a touch sensing method according to an embodiment of the invention.

Please refer to FIG. 3 and FIG. 8. FIG. 8 is a flowchart illustrating steps according to an embodiment of the invention. FIG. 8 illustrates steps that are performed after step S144, i.e. after the driving circuit 240 activates a third analog scan and sensing function in the touch sensing method. First, step C10 is performed, and the driving circuit 240 activates the third analog scan and sensing function. Next, step C10 is performed, and the driving circuit 240 inputs different voltages to the two ends of the first conductive patterns (at least two of the first conductive patterns 211~214) corresponding to the sensing blocks which are touched. Thereafter, in step C30, one end of each of the second conductive patterns (at least two of the second conductive patterns 221~224) corresponding to the sensing blocks which are touched senses at least two fourth sensing signals S4 and sends back the fourth sensing signals S4 to the driving circuit 240, such that several coordinates (X1, X2, ... ) in the first direction are determined. In step C40, the driving circuit 240 respectively inputs different voltages to the two ends of the second conductive patterns corresponding to the same sensing blocks which are touched. In step C50, one end of each of the first conductive patterns corresponding to the sensing blocks which are touched senses at least two fifth sensing signals S5 and sends back the fifth sensing signals S5 to the driving circuit 240, such that several coordinates (Y1, Y2, ... ) in the second direction are determined. Finally, several touch positions (X1, Y1), (X2, Y2), etc., are determined by combining the coordinates (X1, X2, ... ) in the first direction and the coordinates (Y1, Y2, ... ) in the second direction. Besides, after step C50, the touch sensing method of the embodiment further includes different steps according to requirements for resolution as shown in steps C630, C714, and C722.

Referring to FIG. 2, for example, the sensing block corresponding to the touch position T1 is the overlapping portion between the first conductive pattern 212 and the second conductive pattern 224, and the sensing block corresponding to the touch position T2 is the overlapping portion between the first conductive pattern 213 and the second conductive pattern 221. In step S144, the driving circuit 240 senses that two of the sensing blocks corresponding to the touch positions T1 and T2 are touched. The driving circuit 240 then directly inputs different voltages to two ends of the first conductive patterns 212 and 213, such that the scanning process is executed. Next, one end (the third electrodes EY1 and EY4 or the fourth electrodes EY5 and EY8) of each of the second conductive patterns (the second conductive patterns 221~224) corresponding to the sensing blocks which are touched senses two fourth sensing signals S4 and sends back the fourth sensing signals S4 to the driving circuit 240. Thus, two coordinates (X1, X2) in the first direction are determined. Similarly, the driving circuit 240 directly inputs different voltages to two ends of the second conductive patterns 221 and 224, such that the scanning process is executed. After that, one end (the first electrodes EX1 and EX3 or the second electrodes EX6 and EX7) of each of the first conductive patterns (the first conductive patterns 212 and 213) corresponding to the sensing blocks which are touched senses two fifth sensing signals S5 and sends back the fifth sensing signals S5 to the driving circuit 240. Thereby, two coordinates (Y1, Y2) in the second direction are determined. Finally, the touch positions T1 (X1, Y1) and T2 (X2, Y2) are determined by combining the two coordinates (X1, X2) in the first direction and the two coordinates (Y1, Y2) in the second direction. The last step can be varied based on different requirements for resolution, and detailed descriptions are described as follows.

Specifically, steps C50~C714 are performed to comply with the requirement for high resolution. It is assumed that a third analog-to-digital converter is able to convert an analog signal into a digital signal equal to or more than 5 bits, and a fourth analog-to-digital converter is able to convert an analog signal into a digital signal which is between 2 bits and 4 bits.

After step C50, step C60 can be directly performed to meet the requirement for high resolution. At this moment, at least one third analog-to-digital converter respectively converts the fourth sensing signals S4 sensed in step C30 and the fifth sensing signals S5 sensed in step C50 into a plurality of fifth digital signals DS5 and a plurality of sixth digital signals DS6, and the fifth digital signals DS5 and the sixth digital signals DS6 are equal to or more than 5 bits. Several coordinate (X1, X2, ... ) in the first direction are then determined according to the fifth digital signals DS5, and several coordinates (Y1, Y2, ... ) in the second direction are determined according to the sixth digital signals DS6 in step C620. Finally, as shown in step C630, several touch positions (X1, Y1), (X2, Y2), etc., are determined by combining several coordinates (X1, X2, ... ) in the first direction and several coordinates (Y1, Y2, ... ) in the second direction.

In addition, steps C50~C714 may be also performed for the requirement for high resolution. In step C70, at least a fourth analog-to-digital converter respectively converts the fourth sensing signals S4 sensed in step C30 and the fifth sensing signals S5 sensed in step C50 into a plurality of fifth digital signals DS5 and a plurality of sixth digital signals DS6, and the fifth digital signals DS5 and the sixth digitals signals DS6 are between 2 bits and 4 bits. That is to say, the fourth analog-to-digital converter converts an analog signal into a digital signal which is between 2 bits and 4 bits.

In step C710, at least one third analog-to-digital converter respectively converts the fourth sensing signal S4 and the fifth sensing signal S5 into a seventh digital signal DS7 and an eighth digital signal DS8, and the seventh digital signal DS7 and the eighth digital signal DS8 are equal to or more than 5 bits. In step C712, several coordinates (X1, X2, ... ) in the first direction are determined according to the seventh digital signals DS7, and several coordinates (Y1, Y2, ... ) in the second direction are determined according to the eighth digital signals DS8. Finally, in step C714, several touch positions (X1, Y1), (X2, Y2), etc., are determined by combining several coordinates (X1, X2, ... ) in the first direction and several coordinates (Y1, Y2, ... ) in the second direction.

Furthermore, steps C50~C722 can be performed if high resolution is not required. After step C70, several coordinates (X1, X2, ... ) in the first direction are determined according to the fifth digital signals DS5, and several coordinates (Y1, Y2, ... ) in the second direction are determined according to the sixth digital signal DS6 as shown in step C720. Finally, in step C722, several touch positions (X1, Y1), (X2, Y2), etc., are determined by combining several coordinates (X1, X2, ... ) in the first direction and several coordinates (Y1, Y2, ... ) in the second direction.

In summary, according to the embodiments of the invention, the first and the second conductive patterns are arranged in array and in either the analog driving manner or digital driving manner. Thus, the resistive type touch apparatus of the invention is able to determine a touch position correctly in the single-touch mode or in the multi-touch mode. In particular, the resolution of the resistive type touch apparatus of the invention can be adjusted based on actual requirements, such that the load of resistive type touch apparatus (driving IC) can be adjusted, and applications of the resistive type touch apparatus are more flexible.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch sensing method, adapted to a resistive type touch apparatus, wherein the resistive type touch apparatus comprises:
a touch panel comprising:
a first transparent substrate;
a plurality of first conductive patterns disposed on the first transparent substrate, each of the first conductive patterns being parallel to a first direction;
a plurality of first electrodes and a plurality of second electrodes respectively disposed on two ends of the first conductive patterns;
a second transparent substrate disposed opposite to the first transparent substrate;
a plurality of second conductive patterns disposed on the second transparent substrate, the first conductive patterns and the second conductive patterns being located between the first transparent substrate and the second transparent substrate, each of the second conductive patterns being parallel to a second direction, wherein the first direction intersects the second direction;
a plurality of third electrodes and a plurality of fourth electrodes respectively disposed on two ends of the second conductive patterns;
a plurality of spacers located between the first transparent substrate and the second transparent substrate; and
a driving circuit, configured to set the resistive type touch apparatus to operate in a digital mode or in an analog mode, the driving circuit being coupled to the first electrodes, the second electrodes, the third electrodes, and the fourth electrodes,
wherein overlapping portions between the first conductive patterns and the second conductive patterns are defined as a plurality of sensing blocks, and the touch sensing method further comprises:
selecting an operation mode, such that the resistive type touch apparatus operates either in a single-touch mode or in a multi-touch mode;
when the resistive type touch apparatus operates in the single-touch mode, the driving circuit activating a first analog scan and sensing function;
when the resistive type touch apparatus operates in the multi-touch mode, the driving circuit activating either a second analog scan and sensing function or a digital scan and sensing function; and
when the digital scan and sensing function is activated and the driving circuit senses that one of the sensing blocks is touched, the driving circuit then activating the first analog scan and sensing function.

2. The touch sensing method of claim 1, when the driving circuit activates the first analog scan and sensing function, the touch sensing method further comprising:
simultaneously inputting a first voltage to the first electrodes and a second voltage to the second electrodes by applying the driving circuit;
sensing a first voltage division signal and sending back the first voltage division signal to the driving circuit by applying the third electrodes, such that a coordinate X in the first direction is defined;
simultaneously inputting a third voltage to the third electrodes and a fourth voltage to the fourth electrodes by applying the driving circuit;
sensing a second voltage division signal and sending back the second voltage division signal to the driving circuit by applying the first electrodes, such that a coordinate Y in the second direction is defined; and
combining the coordinate X in the first direction and the coordinate Y in the second direction, such that a touch position (X, Y) is determined.

3. The touch sensing method of claim 2, further comprising:
electrically connecting the first electrodes with one another so as to receive the first voltage, and electrically connecting the second electrodes with one another so as to receive the second voltage; and
electrically connecting the third electrodes with one another so as to receive the third voltage, and electrically connecting the fourth electrodes with one another so as to receive the fourth voltage.

4. The touch sensing method of claim 1, when the driving circuit activates the second analog scan and sensing function, the touch sensing method further comprising:
sequentially inputting different voltages to the two ends of the first conductive patterns via the first electrodes and the second electrodes by applying the driving circuit;
sensing at least a first sensing signal and sending back the at least a first sensing signal to the driving circuit by applying the third electrodes, such that at least a coordinate X in the first direction is determined;
sequentially inputting different voltages to the two ends of the second conductive patterns via the third electrodes and the fourth electrodes by applying the third electrodes;
sensing at least a second sensing signal and sending back the at least a second sensing signal to the driving circuit by applying the first electrodes, such that at least a coordinate Y in the first direction is determined; and
combining the at least a coordinate X in the first direction and the at least a coordinate Y in the second direction, such that at least a touch position (X, Y) is determined.

5. The touch sensing method of claim 4, wherein the driving circuit comprises at least an analog-to-digital converter (ADC), and the touch sensing method further comprises:
converting the at least a first sensing signal and the at least a second sensing signal into a first digital signal and a second digital signal by applying the ADC; and
determining the at least a coordinate X in the first direction according to the first digital signal and the at least a coordinate Y in the second direction according to the second digital signal,
wherein when the first digital signal and the second digital signal are between 2 bits and 4 bits, the resistive type touch apparatus is defined as operating in a low resolution analog mode; and
when the first digital signal and the second digital signal are equal to or more than 5 bits, the resistive type touch apparatus is defined as operating in a high resolution analog mode.

6. The touch sensing method of claim 5, wherein the driving circuit comprises at least a first ADC and a second ADC, and the touch sensing method further comprises:
first, operating the resistive type touch apparatus in the low resolution analog mode;
respectively converting the at least a first sensing signal and the at least a second sensing signal into the first digital signal and the second digital signal by applying the second ADC, wherein the first digital signal and the second digital signal are between 2 bits and 4 bits;
then, operating the resistive type touch apparatus in the high resolution analog mode;
respectively converting the at least a first sensing signal and the at least a second sensing signal into a third digital signal and a fourth digital signal by applying the first ADC, wherein the third digital signal and the fourth digital signal are equal to or more than 5 bits; and determining the at least a coordinate X in the first direction according to the third digital signal and the at least a coordinate Y in the second direction according to the fourth digital signal.

7. The touch sensing method of claim 1, when the driving circuit activates the digital scan and sensing function, the touch sensing method further comprising:

inputting a plurality of fifth voltages to the first electrodes of the first conductive patterns by applying the driving circuit so as to scan;

sensing at least a third sensing signal and sending back the at least a third sensing signal to the driving circuit by applying the third electrodes of the second conductive patterns, such that at least one of the sensing blocks touched by a user is determined.

8. The touch sensing method of claim 7, further comprising:

sensing that at least two of the sensing blocks are touched and outputting a plurality of 1-bit signals corresponding to the touched sensing blocks by applying the driving circuit.

9. The touch sensing method of claim 7, further comprising:

sensing that at least two of the sensing blocks are touched and activating a third analog scan and sensing function by applying the driving circuit;

respectively inputting different voltages to the two ends of the first conductive patterns corresponding to the touched sensing blocks;

one end of each of the second conductive patterns corresponding to the touched sensing blocks sensing at least two fourth sensing signals and sending back the at least two fourth sensing signals to the driving circuit, such that a plurality of first coordinates in the first direction are determined;

respectively inputting different voltages to the two ends of the second conductive patterns corresponding to the touched sensing blocks;

one end of each of the first conductive patterns corresponding to the touched sensing blocks sensing at least two fifth sensing signals and sending back the at least two fifth sensing signals to the driving circuit, such that a plurality of second coordinates in the second direction are determined; and combining the first coordinates in the first direction and the second coordinates in the second direction, such that a plurality of touch positions (X, Y) are determined.

10. The touch sensing method of claim 9, wherein the driving circuit comprises at least an ADC, and the touch sensing method further comprises:

converting the at least two fourth sensing signals and the at least two fifth sensing signals into a plurality of fifth digital signals and a plurality of sixth digital signals by applying the at least an ADC, such that the first coordinates in the first direction and the second coordinates in the second direction are determined, wherein when the fifth digital signals and the sixth digital signals are between 2 bits and 4 bits, the resistive type touch apparatus is defined as operating in a low resolution analog mode; and when the fifth digital signals and the sixth digital signals are equal to or more than 5 bits, the resistive type touch apparatus is defined as operating in a high resolution analog mode.

11. The touch sensing method of claim 10, wherein the driving circuit comprises at least a third ADC and a fourth ADC, and the touch sensing method further comprises:

respectively converting the at least two fourth sensing signals and the at least two fifth sensing signals into the fifth digital signals and the sixth digital signals by applying the fourth ADC, wherein the fifth digital signals and the sixth digital signals are between 2 bits and 4 bits;

then, respectively converting the at least two fourth sensing signals and the at least two fifth sensing signals into a plurality of seventh digital signals and a plurality of eighth digital signals by applying the third ADC, wherein the seventh digital signals and the eighth digital signals are equal to or more than 5-bits; and determining the first coordinates in the first direction according to the seventh digital signals and the second coordinates in the second direction according to the eighth digital signals.

12. The touch sensing method of claim 1, wherein the driving circuit comprises at least a switch circuit, and the touch sensing method further comprises:

determining whether the resistive type touch apparatus operates in the digital mode or the analog mode according to a control signal by applying the at least a switch circuit.

13. The touch sensing method of claim 1, wherein the driving circuit comprises at least a first ADC and a second ADC, and the touch sensing method further comprises:

determining whether the resistive type touch apparatus operates in a low resolution analog mode or in a high resolution analog mode, wherein when the resistive type touch apparatus operates in the high resolution analog mode, the driving circuit outputs a signal equal to or more than 5 bits via the at last a first ADC; and when the resistive type touch apparatus operates in the low resolution analog mode, the driving circuit outputs a signal between 2 bits and 4 bits via the second ADC.

* * * * *